(12) United States Patent
Tian et al.

(10) Patent No.: US 7,254,292 B2
(45) Date of Patent: Aug. 7, 2007

(54) DIRECTING OPTICAL CHANNELS USING A REFLECTIVE DEVICE

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 11/015,210

(22) Filed: Dec. 17, 2004

(65) Prior Publication Data
US 2006/0133723 A1 Jun. 22, 2006

(51) Int. Cl.
*G02B 6/26* (2006.01)
(52) U.S. Cl. .................... 385/17; 385/18; 385/19; 359/128; 359/127
(58) Field of Classification Search ............ 385/16–19, 385/33; 398/156, 81; 359/127–128, 117, 359/139, 290
See application file for complete search history.

(56) References Cited

U.S. PATENT DOCUMENTS

| 6,289,145 | B1 |   | 9/2001 | Solgaard et al. ............... 385/17 |
| 6,535,311 | B1 | * | 3/2003 | Lindquist ..................... 398/82 |
| 6,798,941 | B2 | * | 9/2004 | Smith et al. ................... 385/18 |
| 6,934,069 | B2 | * | 8/2005 | Moon et al. .................. 359/290 |
| 2005/0047711 | A1 | * | 3/2005 | Ide et al. ..................... 385/18 |

OTHER PUBLICATIONS

Communication from the European Patent Office, European Search Report dated May 12, 2006, for International Application No. 05026179.1-2216, 6 pages.

"Flashwave 7500 Core System, High-capacity 40-channel ROADM Solution", FUJITSU The Possibilities Are Infinite, Copyright © Fujitsu 2000-2004, 1 page.

Gordon Wilson, et al., "Spectral Filter with Independently Variable Center Wavelength and Bandwidth", ECOC 2004 Proceedings—Post-Deadline, Paper Th4.2.1, 2 pages.

R. Ryf, et al., "PDP10 Data rate and channel spacing flexible wavelength blocking filter", © 2004 Optical Society of America, 3 pages.

"Flashwave® 7500, Flexible Metra Regional Transport", FUJITSU The Possibilities Are Infinite, FLASHWAVE7500/DS/2.0/05.04/CM, © Copyright May 2004 Fujitsu Network Communications, Inc., 4 pages.

"Extending the Reach & Capacity of Metro Network Spans", FUJITSU The Possibilities Are Infinite, NETSTENDER/SB/1.0/09.04/CM, © Copyright Sep. 2004 Fujitsu Network Communications, Inc., 7 pages.

(Continued)

*Primary Examiner*—Brian Healy
*Assistant Examiner*—Guy G. Anderson
(74) *Attorney, Agent, or Firm*—Baker Botts L.L.P.

(57) ABSTRACT

A device for directing one or more optical channels includes one or more micromirror elements. A micromirror element has a mirror and a mirror controller. The mirror is operable to reflect light at a first interaction area to yield a first passband for an optical channel, and to reflect light at a second interaction area to yield a second passband for the optical channel. The mirror controller operates to position the mirror at a first position at which light interacts with the first interaction area to yield the first passband, and to position the mirror at a second position at which light interacts with the second interaction area to yield the second passband.

11 Claims, 6 Drawing Sheets

OTHER PUBLICATIONS

"*Flashwave® 7500 Small System, Cost-Effective ROADM Networks*", Fujitsu The Possibilities Are Infinite, Flashwave 7500S/DS/1.0/10.04/CM, © Copyright Oct. 2004, Fujitsu Network Communications, Inc., 2 pages.

"*Dynamic Remote Reconfigurability for All-Optical Networks, Products/Technology, Capella WavePath Family of 1×9 Wavelength Selective Switches (WSS), The WavePath 4500, and The WavePath 9600*" sales@capellaphotonics.com, 7 pages, Printed Nov. 16, 2004.

* cited by examiner

DIRECTING OPTICAL CHANNELS USING A REFLECTIVE DEVICE

TECHNICAL FIELD

This invention relates generally to the field of optical switches and more specifically to directing optical channels using a reflective device.

BACKGROUND

A communication network for a geographic area, such as a metropolitan area, may have a ring topology. As an example, a synchronous optical network (SONET) system may comprise a ring with nodes. In operation, channels of packets travel through the nodes. A node may add or drop channels in order to direct the packets through the ring.

A node may include a wavelength device with a reflective device that is used to add or drop channels. According to known techniques, the reflective device has a fixed passband for each channel. A fixed passband for each channel, however, may be inefficient in certain situations. It is generally desirable to be efficient in certain situations.

SUMMARY OF THE DISCLOSURE

In accordance with the present invention, disadvantages and problems associated with previous techniques for directing optical signals may be reduced or eliminated.

According to one embodiment of the present invention, a device for directing one or more optical channels includes one or more micromirror elements. A micromirror element has a mirror and a mirror controller. The mirror is operable to reflect light at a first interaction area to yield a first passband for an optical channel, and to reflect light at a second interaction area to yield a second passband for the optical channel. The mirror controller operates to position the mirror at a first position at which light interacts with the first interaction area to yield the first passband, and to position the mirror at a second position at which light interacts with the second interaction area to yield the second passband.

Certain embodiments of the invention may provide one or more technical advantages. A technical advantage of one embodiment may be that a reflective device of a wavelength device may have different passbands for different channels of the wavelength device. The different passbands may be used to accommodate different data rates, which may improve spectrum efficiency. Another technical advantage of one embodiment may be that the reflective device may be adjusted to change the passband of a channel.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
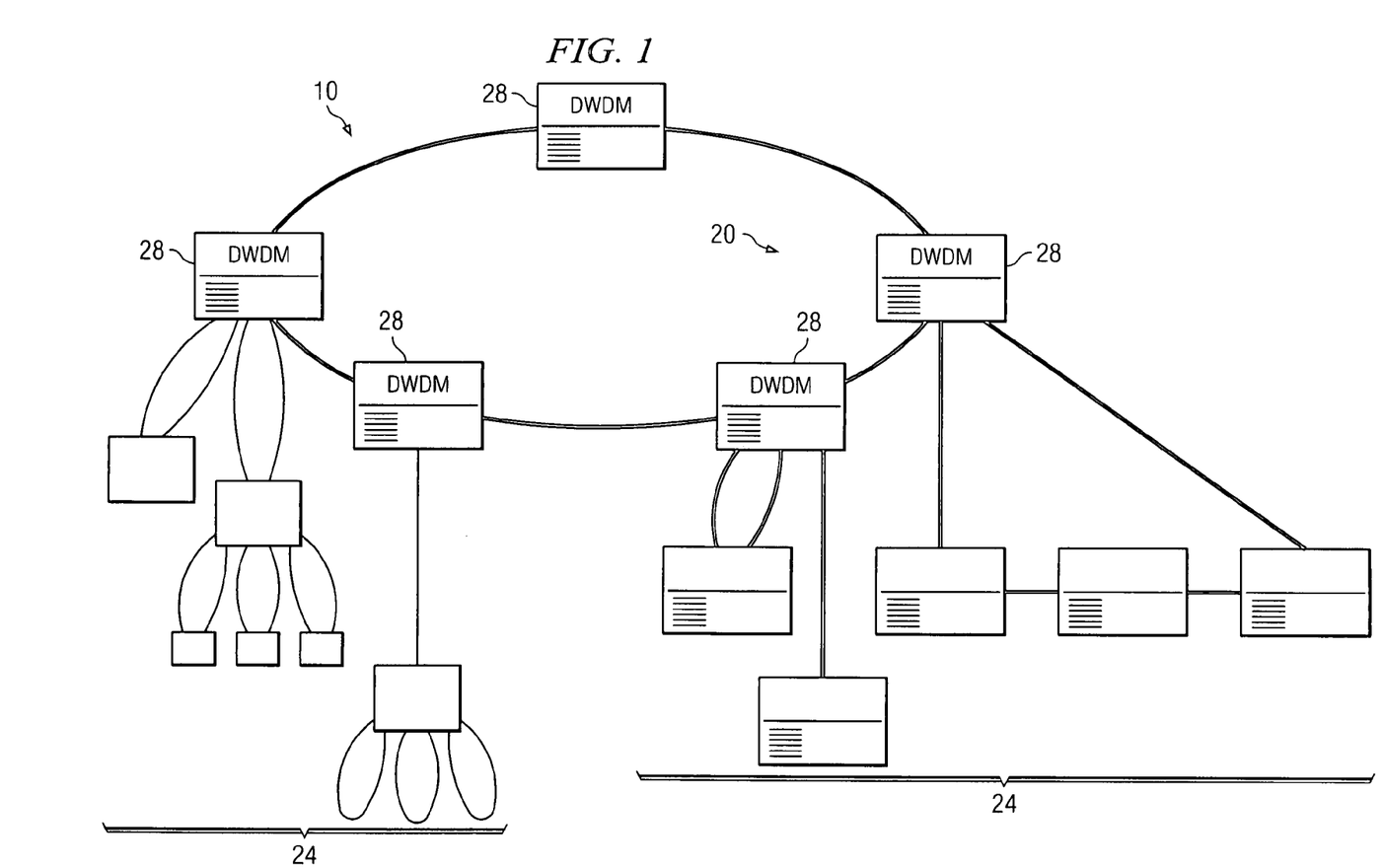
FIG. 1 is a block diagram illustrating one embodiment of a network that includes a ring for routing packets.

FIG. 1 is a block diagram illustrating one embodiment of a network 10 that includes a ring 20 for routing packets. According to the embodiment, ring 20 may include wavelength devices with reflective devices that can add or drop channels. A reflective device may have different passbands for different channels of the wavelength device. The reflective device may also be readily adjusted to change the passband of a channel.

According to the illustrated embodiment, network 10 communicates information in packets. A packet may comprise a bundle of data organized in a specific way for transmission, and a frame may comprise the payload of one or more packets organized in a specific way for transmission. A packet may carry any suitable information such as voice, data, audio, video, multimedia, other information, or any combination of the preceding. The packets may comprise any suitable multiplexed packets, such time division multiplexed (TDM) packets, communicated using any suitable protocol such as the Ethernet over SONET protocol.

Network 10 includes ring 20 coupled to access equipment 24 as shown. A ring may refer to a network of communication devices that has a ring topology. According to one embodiment, ring 20 may comprise an optical fiber ring. For example, ring 20 may comprise a resilient packet ring (RPR) that includes SONET devices. Ring 20 has nodes 28. A node may refer to a point of a ring at which packets may be communicated to, from, or both to and from the ring.

Channels communicate packets through ring 20. A channel may refer to a communication path having a defined bandwidth. For example, a channel may refer to an optical channel having a specific wavelength range. Channel spacing may be approximately 100 hertz to 100 gigahertz. At each node 28, packets that are not destined for a node 28 pass through the node 28, and are not queued at the node 28.

According to the illustrated embodiment, a node 28 may comprise a dense wavelength division multiplexer (DWDM). An example is described in more detail with reference to FIG. 2. A DWDM may include a wavelength device such as a wavelength selective switch or a wavelength blocker. A wavelength device may refer to a device that operates to switch, add, drop, or otherwise manipulate channels. Example wavelength devices are described in more detail with reference to FIGS. 3 and 4.

According to one embodiment, a wavelength device may include a reflective device used to direct optical channels. A reflective device includes elements that each correspond to a channel. A passband of a channel may refer to the wavelength range passed by the element corresponding to the channel. According to the embodiment, the elements may be adjusted in order to vary the passbands of the channels. Example elements are described in more detail with reference to FIGS. 5 through 7.

Variable passbands for the channels may provide for more efficient use of bandwidth. As an example, channels that use different data rates typically utilize passbands of different widths. A channel having a lower data rate may use a smaller passband. Accordingly, the passband of a channel may be adjusted to accommodate the passband of a data rate. For example, a channel with a data rate of 10 gigabits per second may require a smaller passband than a data channel having a data rate of 40 gigabits per second.

Access equipment 24 may include any suitable device operable to communicate with nodes 28 of ring 20. Examples of access equipment include access gateways, endpoints, softswitch servers, trunk gateways, networks, access service providers, Internet service providers, or other device operable to communicate with nodes 28 of ring 20.

Modifications, additions, or omissions may be made to network 10 without departing from the scope of the invention. The components of network 10 may be integrated or separated according to particular needs. Moreover, the operations of network 10 may be performed by more, fewer, or other devices. Additionally, operations of network 10 may be performed using any suitable logic. Logic may refer to hardware, software, or any combination of hardware and software. As used in this document, "each" refers to each member of a set or each member of a subset of a set.

Figure 2:
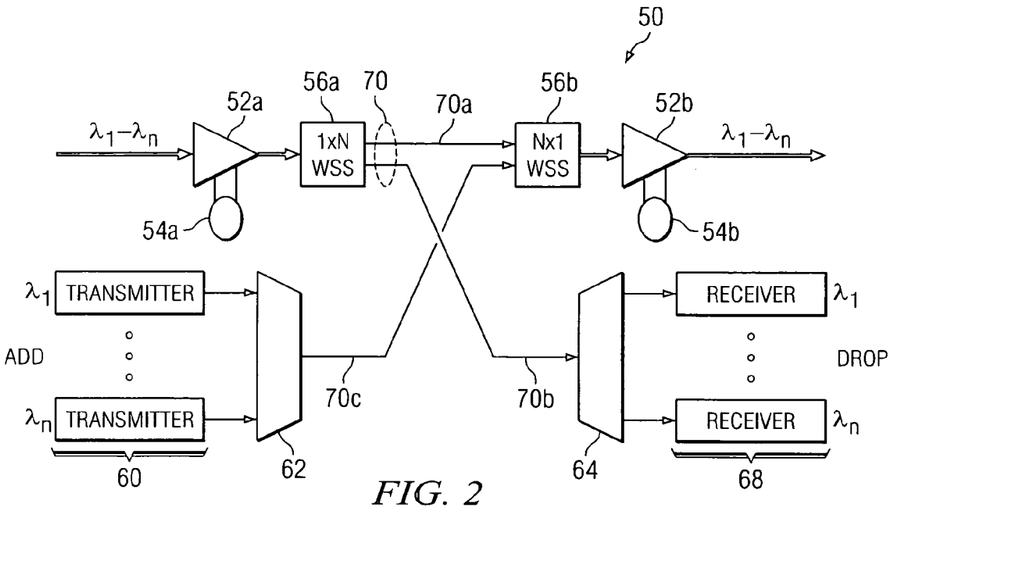
FIG. 2 is a diagram illustrating one embodiment of an optical adding/dropping node that may be used at a node of the network of FIG. 1.

FIG. 2 is a diagram illustrating one embodiment of an optical adding/dropping node 50 that may be used at node 28 of network 10 of FIG. 1. Optical adding/dropping node 50 may include a wavelength selective switch that may have different passbands for different channels.

According to the illustrated embodiment, optical adding/dropping node 50 includes power amplifiers 52, dispersion compensating fibers (DCF) 54, wavelength selective switches (WSSs) 56, transmitters 60, a multiplexer 62, a demultiplexer 64, and receivers 68 coupled as shown. According to one embodiment of operation, optical adding/dropping node 50 receives a signal with channels having wavelengths $\lambda_1$ through $\lambda_n$. Power amplifier 52a amplifies the received signal. Dispersion compensating fiber 54a may be used to reduce dispersion.

Wavelength selective switch 56a demultiplexes the received signal into the separate channels 70, including one or more kept channels 70a and one or more dropped channels 70b. According to one embodiment, wavelength selective switch 56a may include a reflective device that may have different passbands for different channels. Demultiplexer 64 demultiplexes dropped channels 70b and sends dropped channels 70b to receivers 68. Transmitters 60 transmit signals to multiplexer 62. Multiplexer 62 multiplexes the channels to yield one or more added channels 70c.

Wavelength selective switch 56b multiplexes kept channels 70a received from wavelength selective switch 56a and added channels 70c received from multiplexer 62. According to one embodiment, wavelength selective switch 56b may include a reflective device that may have different passbands for different channels. Power amplifier 52b amplifies the multiplexed channels to yield an output signal that includes wavelengths $\lambda_1$ through $\lambda_n$. Dispersion control fiber 54b may be used to reduce dispersion of power amplifier 52b.

Modifications, additions, or omissions may be made to optical adding/dropping node 50 without departing from the scope of the invention. The components of optical adding/dropping node 50 may be integrated or separated according to particular needs. Moreover, the operations of optical adding/dropping node 50 may be performed by more, fewer, or other components.

Figure 3:
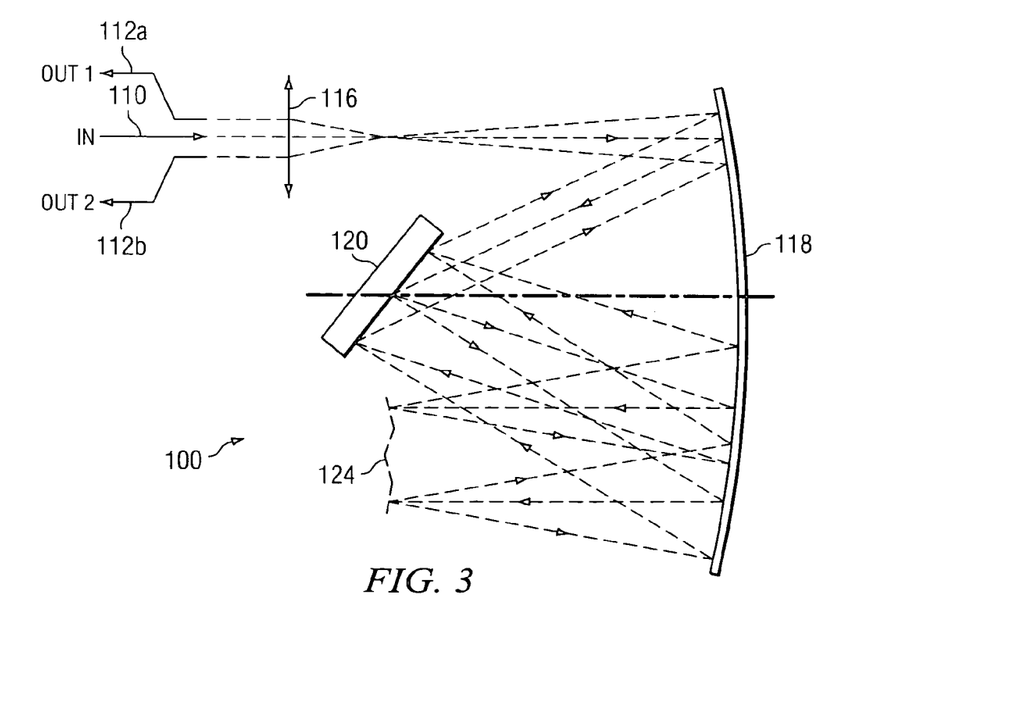
FIG. 3 is a diagram illustrating one embodiment of a wavelength selective switch that may be used with the optical adding/dropping node of FIG. 2.

FIG. 3 is a diagram illustrating one embodiment of a wavelength selective switch 100 that may be used with optical adding/dropping node 50 of FIG. 2. According to the illustrated embodiment, wavelength selective switch 100 includes an input 110, outputs 112, a first focusing device 116, a second focusing device 118, a dispersive device 120, and a reflective device 124 coupled as shown.

According to one embodiment of operation, a signal with multiplexed channels is received at input 110. First focusing device 116 focuses the received signal towards second focusing device 118. A focusing device may refer to a device that defocuses or focuses light beams. Example focusing devices include lenses and concave mirrors. First focusing device 116 may comprise a lens such as an angle-to-offset lens, and second focusing device 118 may comprise a concave mirror.

Second focusing device 118 directs the received signal to dispersive element 120. A dispersive element may refer to a device that demultiplexes or multiplexes channels, and may comprise, for example, a reflective grating, a transmissive grating, or a prism. According to the illustrated embodiment, dispersive element 120 separates the signal into channels, and may comprise a grating. The channels are directed towards second focusing device 118, which reflects the channels towards reflective device 124.

Reflective device 124 selectively directs the channels towards specific outputs. As an example, certain channels are directed towards output 112a and other channels are directed towards output 112b. According to one embodiment of the invention, reflective device 124 may have different passbands for different channels.

Modifications, additions, or omissions may be made to switch 100 without departing from the scope of the invention. The components of switch 100 may be integrated or separated according to particular needs. Moreover, the operations of switch 100 may be performed by more, fewer, or other components.

Figure 4:
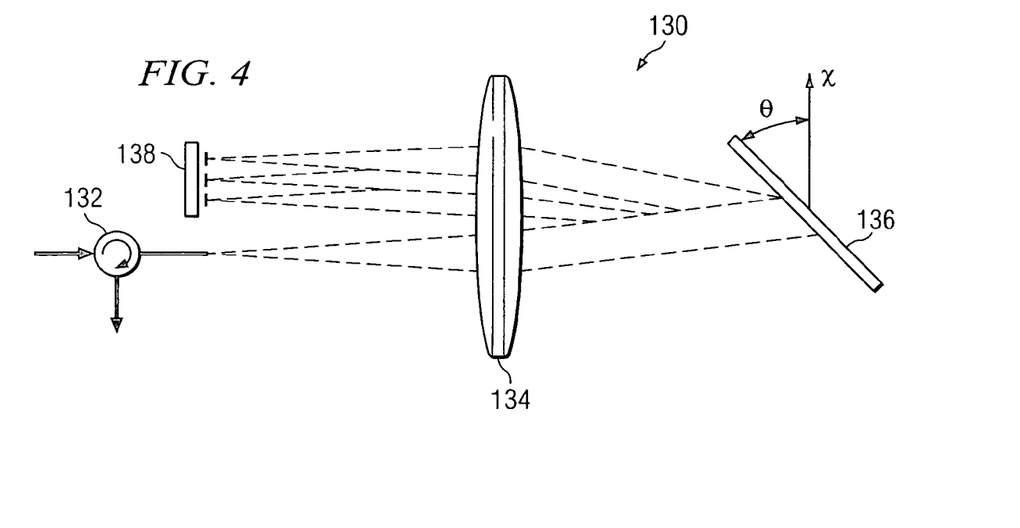
FIG. 4 is a diagram illustrating one embodiment of a wavelength blocker that may be used with the optical adding/dropping node of FIG. 2.

FIG. 4 is a diagram illustrating another embodiment of a wavelength blocker 130 that may be used with optical adding/dropping node 50 of FIG. 2. According to the illustrated embodiment, wavelength blocker 130 includes a circulator 132, a focusing device 134, a dispersive device 136, and a reflective device 138 coupled as shown.

According to one embodiment of operation, circulator 132 receives a signal with channels, and directs the received signal towards focusing device 134. According to the illustrated embodiment, focusing device 134 comprises a lens. Focusing device 134 focuses the signal towards dispersive element 136. According to the illustrated embodiment, dispersive element 136 comprises a grating. Dispersive device 136 separates the channels of the signal, and directs the signals towards focusing device 134. Focusing device 134 focuses the channels toward reflective device 138.

Reflective device 138 directs selected channels through focusing device 134, to dispersive element 136, back through focusing device 134, and towards circulator 132. According to one embodiment of the invention, reflective device 124 may have different passbands for different channels. Circulator 132 outputs the selected channels.

Modifications, additions, or omissions may be made to blocker 130 without departing from the scope of the invention. The components of blocker 130 may be integrated or separated according to particular needs. Moreover, the operations of blocker 130 may be performed by more, fewer, or other components.

Figure 5:
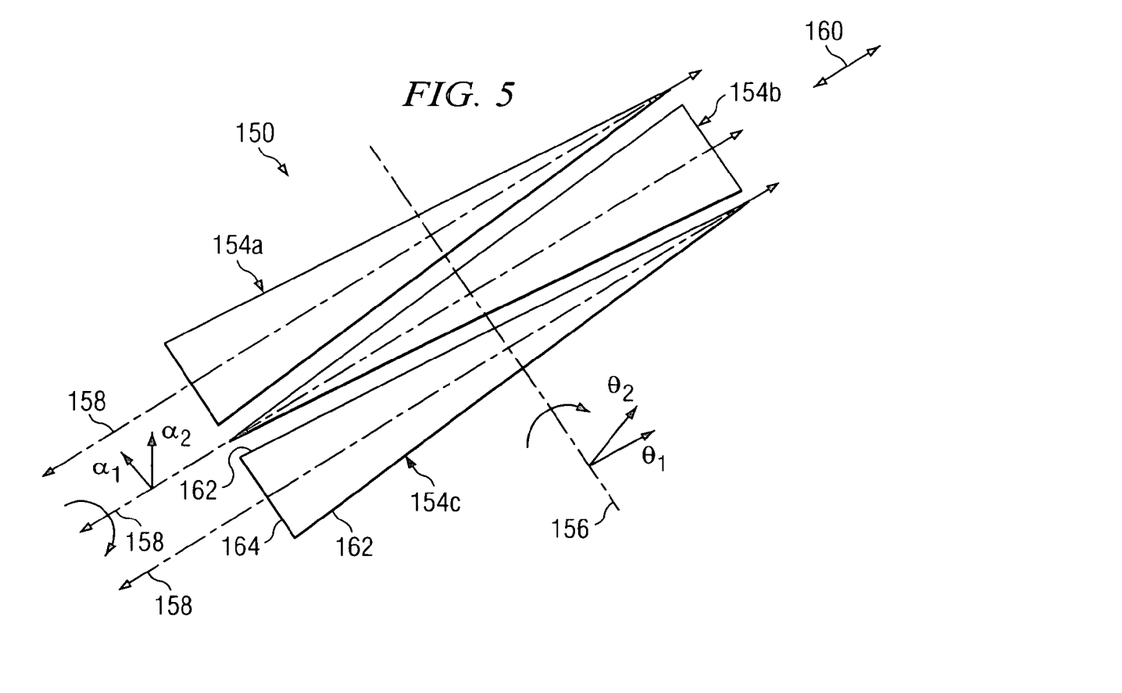
FIG. 5 is a diagram illustrating a portion of one embodiment of a reflective device that may be used with the wavelength selective switch of FIG. 3 or the wavelength blocker of FIG. 4.

FIG. 5 is a diagram illustrating a portion 150 of one embodiment of a reflective device. According to the embodiment, a reflective device has an array of micromirror elements that includes portion 150. A micromirror element has a mirror 154 that reflects a light beam to direct a channel, and has a mirror controller that positions the mirror 154. A mirror may comprise any suitable reflective surface, which may be substantially smooth and flat.

For purposes of illustration, mirrors 154 have a substantially triangular shape, and portion 150 has two rows of micromirror elements, one row with two elements with mirrors 154 pointing in one direction and the other row with one element with a mirror 154 pointing in the opposite direction. A mirror 154, however, may have any suitable shape or size. Moreover, a mirror array may have any suitable number rows or columns of any suitable number of micromirror elements, for example, hundreds or thousands of rows and columns of micromirror elements.

Mirrors 154 may be moved to direct optical channels, and may be independently rotated and translated. For example, rotation or translation of a first mirror 154 may occur independently of rotation or translation of a second mirror 154. According to the illustrated embodiment, a mirror 154 may be rotated about an axis 156 to select an output port. For example, a mirror 154a positioned at angle $\theta_1$ may direct a channel to a first output, but positioned at angle $\theta_2$ may direct the channel to a second output. A mirror 154 may be rotated about an axis 158 to adjust the attenuation of the reflected channel. For example, mirror 154a positioned at angle $\alpha_1$ may yield a channel having a first power, but positioned at angle $\alpha_2$ may yield the channel having a second power.

According to one embodiment, a mirror 154 may be translated along a direction parallel to an axis 160 in order to change the passband of a channel. According to the embodiment, mirror 154 may have a shape that reflects a different bandwidth of a light beam depending upon where the light beam hits the mirror 154. As shown in the illustrated example, mirror 154 has a substantially triangular shape such as an isosceles triangular shape with legs 162 and base 164. Legs 162 may be longer than base 164. For example, the height of the triangle may be approximately more than 2, 5, 6, or 10 times longer than base 164. Mirror 154 may be moved along the direction parallel to axis 160 in order to change the position where a light beam hits mirror 154 in order to change the passband of a channel. The adjustment is described in more detail with reference to FIGS. 6A and 6B.

Figure 6A:
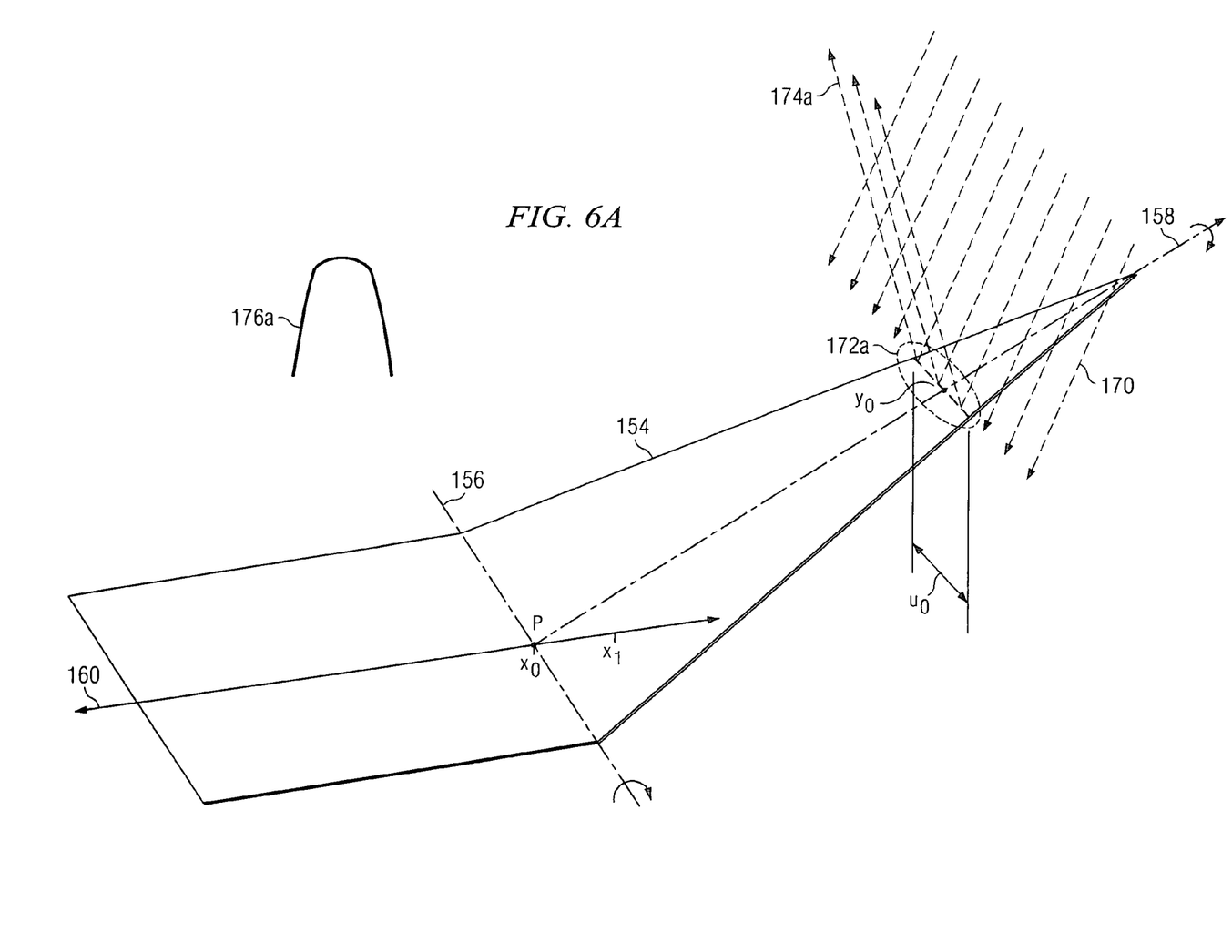
FIGS. 6A and 6B illustrate how translating a mirror of the reflective device of FIG. 5 or FIG. 7 changes the passband of a channel.

FIGS. 6A and 6B illustrate how translating a mirror 154 changes the passband of a channel. Referring to FIG. 6A, mirror 154 is positioned such that a point P of the surface of mirror 150 is located at position $x_0$ of axis 160. Light beam 170 is reflected from mirror 154 at interaction area 172a located at position $y_0$ of axis 158 to yield reflected beam 174a. An interaction area may refer to the area of a reflective surface where a light beam is reflected from the surface.

An interaction area may have a width measured in the direction parallel to axis 156. According to the illustrated embodiment, interaction area 172a has a width $u_0$. Reflected beam 174a yields a passband 176a. In general, a larger interaction area width yields a larger passband width, and a smaller interaction area width yields a smaller passband width.

Figure 6B:
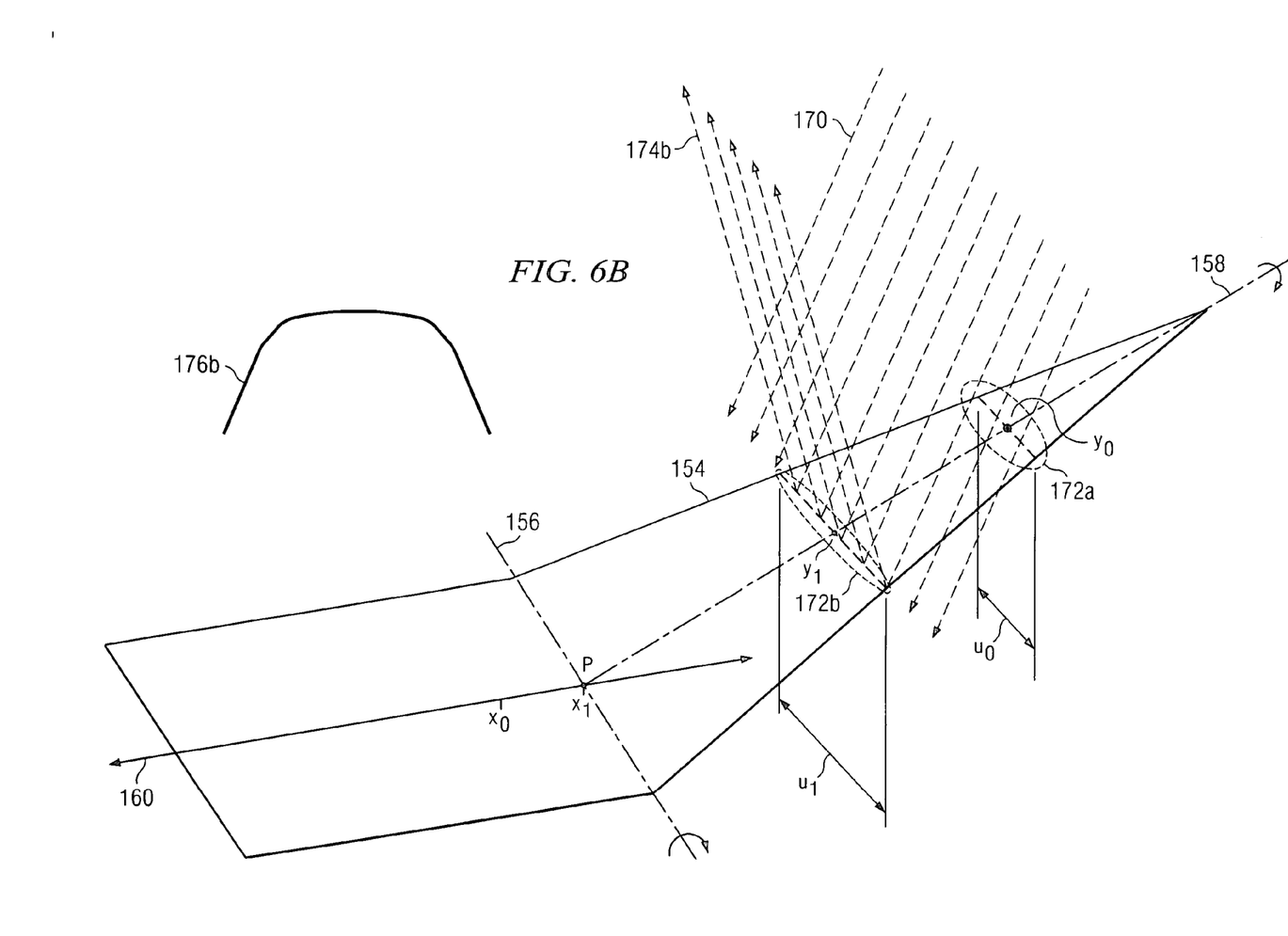

Referring to FIG. 6B, mirror 154 has been translated along axis 160 such that point P is located at position $x_1$ of axis 160. Beam 170 strikes mirror 154 at interaction area 172b at position $y_1$ of axis 158 to yield reflected beam 174b. Interaction area 172b has a width $u_1$ greater than width $u_0$ of interaction area 172a. Accordingly, passband 176b of reflected beam 174b is greater than the passband 176a of reflected beam 174a.

Referring back to FIG. 5, a micromirror element of portion 150 may comprise any suitable components of any suitable arrangement or configuration. A micromirror element typically includes a mirror and a mirror controller operable to control the movement, of the mirror. According to one embodiment, a micromirror element comprises a microelectronic mechanical system (MEMS) cell disposed outwardly from a memory cell. For example, a micromirror element comprises a monolithically integrated MEMS superstructure cell fabricated over a static random-access memory (SRAM) cell.

The memory cell may comprise control circuitry for the reflective device. The control circuitry may comprise any suitable logic capable of at least partially contributing to the creation of the electrostatic forces to move mirror 154. The control circuitry may move mirror 154 based at least in part on data received from a power supply or a processor. As used in this document, "processor" refers to any suitable device operable to accept input and process the input according to predefined rules to produce output.

The MEMS layer may comprise layers such as a conductive layer, a mirror support layer, and a mirror layer. The conductive layer is disposed outwardly from the memory cell, and receives signals from the memory cell in order to move mirror 154 in accordance with the signals. The conductive layer may include static electrodes and conductive conduits. A static electrode comprises any suitable electrode operable to receive a voltage that creates an electrostatic force to move mirror 154. Conductive conduits may electrically couple the static electrodes to the memory cell. The conductive layer may comprise, for example, an aluminum alloy or other suitable conductive material.

The mirror support layer includes components that operate to support and move mirror 154. For example, the mirror support layer may include hinges and a yoke. The hinges may be supported by support posts, and the yoke may be suspended by the hinges. The yoke may comprise any suitably shaped material operable to move about hinges to tilt mirror 154. The mirror layer includes mirror 154. Mirror 154 may comprise any suitable reflective material such as aluminum.

Modifications, additions, or omissions may be made to portion 150 without departing from the scope of the invention. The components of portion 150 may have any suitable size or shape, and may be configured, integrated, or separated according to particular needs. Moreover, the operations of portion 150 may be performed by more, fewer, or other components.

Figure 7:
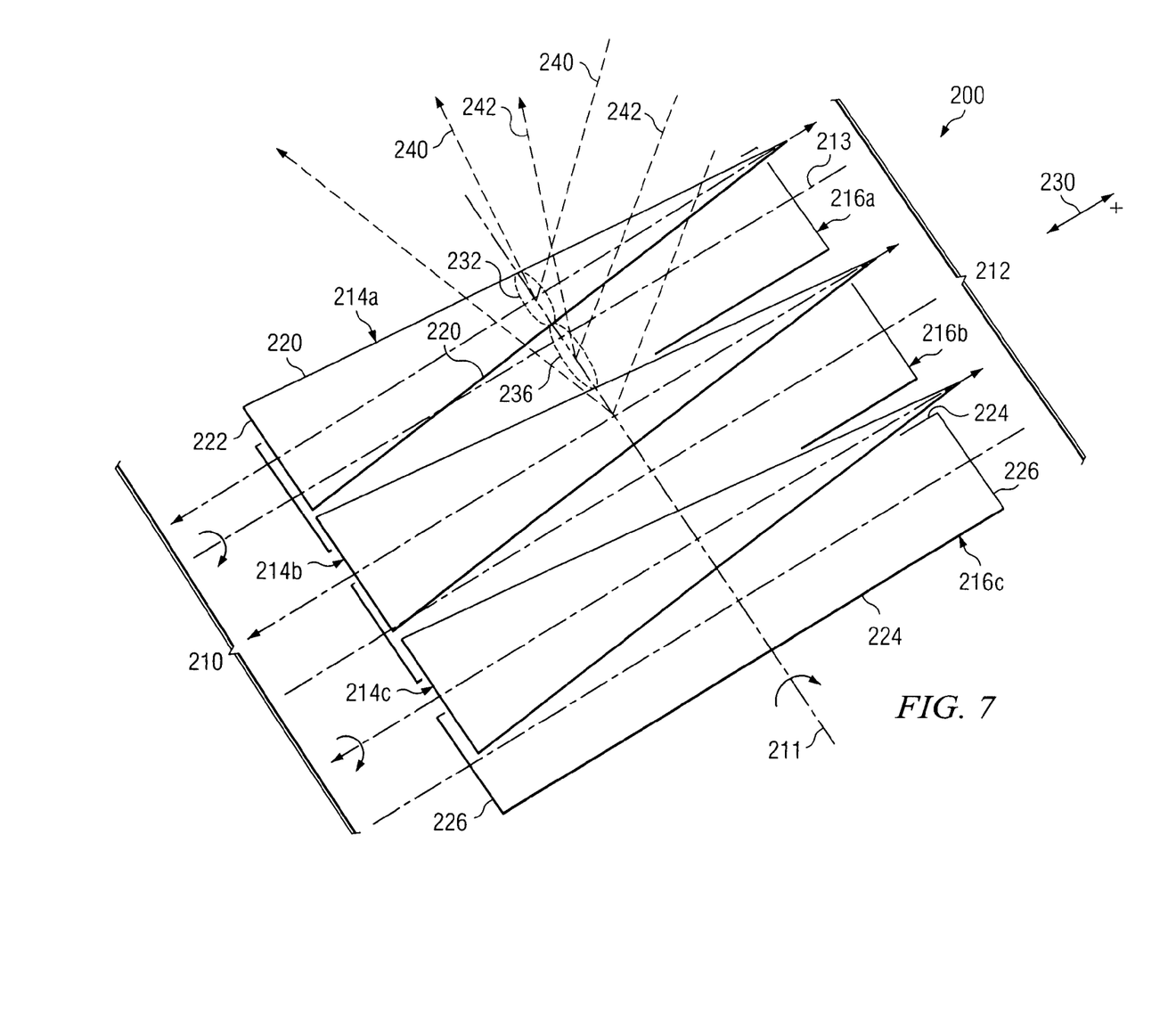
FIG. 7 is a diagram illustrating a portion of another embodiment of a reflective device that may be used with the wavelength selective switch of FIG. 3 or the wavelength blocker of FIG. 4.

FIG. 7 is a diagram illustrating a portion 200 of another embodiment of a reflective device. According to the illustrated embodiment, portion 200 includes layers 210 and 212 of mirrors. Layer 210 may be disposed outwardly from layer 212 such that a light beam arrives at layer 210 before arriving at layer 212. Layer 210 includes mirrors 214, and layer 212 includes mirrors 216. A light beam may be prevented from reaching layer 212 by being reflected by mirror 214 of layer 210. Mirrors 214 and 216 may be rotated along axis 211 to select an output port, and may be rotated about axis 213 for attenuation adjustment.

Mirrors 214 of layer 210 may be substantially similar to mirrors 154 of FIG. 6. According to the illustrated embodiment, a mirror 214 may have a triangular shape with legs 220 and base 222. Mirrors 216 of layer 212 may have a shape that can reflect beams that pass through layer 210. According to the illustrated embodiment, mirrors 216 have a substantially rectangular shape with longer sides 224 and shorter sides 226. Longer sides 224 may be substantially parallel to axis 213, and short sides 226 may be substantially parallel to axis 211. According to one embodiment, shorter sides 226 may have a length substantially equal to the length of bases 222. The length of sides 224 may be substantially equivalent to the height of the triangular shape of mirror 214.

According to one embodiment, mirrors 214 of layer 210 may be translated along a direction parallel to axis 230 in order to change the passbands of the channels. Moving a mirror 214a along a direction parallel to axis 230 changes the interaction area 232 where light beam 240 strikes mirror 214. Changing the interaction area 232 changes the passband as discussed previously. Translating mirror 214a also changes the size of interaction area 236 where light beam 242 is reflected from mirror 216a. For example, moving mirror 214a in a positive direction parallel to axis 230 decreases the interaction area 236 of mirror 216a, while moving mirror 214a in a negative direction parallel to axis 230 increases the interaction area 236 of mirror 216a. That is, moving mirror 214a may change the passband size of mirror 216a. Accordingly, moving mirrors of layer 210 may change the passband size not only of mirrors 214, but also of mirrors 216.

Mirrors 214 may be moved in a positive direction parallel to axis 230 such that the interaction area 236 of one or more mirrors 216 disappear. Accordingly, mirrors 214 may be translated to delete channels controlled by mirrors 216. Any suitable number of channels may be deleted according to this process. For example, one channel controlled by a mirror 216 may be deleted, or all of the channels controlled by mirrors 216 may be deleted.

Modifications, additions, or omissions may be made to portion 200 without departing from the scope of the invention. The components of portion 200 may have any suitable size or shape, and may be configured, integrated, or separated according to particular needs. Moreover, the operations of portion 200 may be performed by more, fewer, or other components.

Certain embodiments of the invention may provide one or more technical advantages. A technical advantage of one embodiment may be that a reflective device of a wavelength device may have different passbands for different channels of the wavelength device. The different passbands may be used to accommodate different data rates, which may improve spectrum efficiency. Another technical advantage of one embodiment may be that the reflective device may be adjusted to change the passband of a channel.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A device for directing one or more optical channels, comprising:
   one or more micromirror elements, each micromirror element associated with an optical channel, each micromirror element comprising:
      a mirror operable to:
         reflect light at a first interaction area of the mirror to direct an associated optical channel, the first interaction area having a first width operable to yield a first passband for the optical channel; and
         reflect light at a second interaction area of the mirror to direct the optical channel, the second interaction area having a second width operable to yield a second passband for the optical channel, the second passband different from the first passband; and
      a mirror controller operable to:
         position the mirror at a first position at which light interacts with the first interaction area of the mirror; and
         position the mirror at a second position at which light interacts with the second interaction area of the mirror.

2. The device of claim 1, wherein each mirror has a substantially isosceles triangular shape having a height and a base, the height being approximately more than five times longer than the base.

3. The device of claim 1, wherein:
   the one or more micromirror elements further comprise a first micromirror element and a second micromirror element, the first micromirror element comprising a first mirror and a first mirror controller, the second micromirror element comprising a second mirror and a second mirror controller;
   the first mirror controller is operable to translate the first mirror along a first direction from the first position to the second position; and
   the second mirror controller is operable to translate the second mirror along a second direction from the first position to the second position, the second direction substantially parallel to the first direction.

4. The device of claim 1, wherein the one or more micromirror elements further comprise a plurality of rows, each row comprising a plurality of micromirror elements.

5. The device of claim 1, wherein:
   the one or more micromirror elements further comprise a first layer comprising a plurality of first layer micromirror elements; and
   the device further comprises a second layer comprising a plurality of second layer micromirror elements, light interacting with the first layer prior to interacting with the second layer.

6. The device of claim 1, wherein:
   the one or more micromirror elements further comprise a first layer comprising a plurality of first layer micromirror elements, a first layer micromirror element comprising a mirror having a substantially triangular shape; and
   the device further comprises a second layer comprising a plurality of second layer micromirror elements, a second layer micromirror element comprising a mirror having a substantially rectangular shape, light interacting with the first layer prior to interacting with the second layer.

7. The device of claim 1, wherein:
the one or more micromirror elements further comprise a first layer comprising a plurality of first layer micromirror elements;
the device further comprises a second layer comprising a plurality of second layer micromirror elements, a second layer micromirror element comprising a mirror having a third interaction area and a fourth interaction area, light interacting with the first layer prior to interacting with the second layer; and
a mirror controller of a first layer micromirror element is further operable to translate the first layer micromirror element from the first position to the second position, the translation directing the light from the third interaction area to the fourth interaction area.

8. The device of claim 1, wherein each mirror controller is further operable to:
position the mirror at a first port selection angle to direct the optical channel to a first port; and
rotate the mirror about a port selection axis to a second port selection angle to direct the optical channel to a second port distinct from the first port.

9. The device of claim 1, wherein each mirror controller is further operable to:
position the mirror at a first attenuation angle to yield reflected light having a first power; and
rotate the mirror about an attenuation axis to a second attenuation angle to yield reflected light having a second power different from the first power.

10. A system for directing one or more optical channels, comprising:
means for reflecting light from one or more micromirror elements, each micromirror element associated with an optical channel, each micromirror element comprising a mirror operable to:
reflect light at a first interaction area of the mirror to direct an associated optical channel, the first interaction area having a first width operable to yield a first passband for the optical channel; and
reflect light at a second interaction area of the mirror to direct the optical channel, the second interaction area having a second width operable to yield a second passband for the optical channel, the second passband different from the first passband;
means for positioning a particular mirror of a particular micromirror element at a first position at which light interacts with the first interaction area of the mirror, the particular mirror positioned using a mirror controller; and
means for positioning the particular mirror at a second position at which light interacts with the second interaction area of the particular mirror.

11. A device for directing one or more optical channels, comprising:
a first layer comprising a plurality of first layer micromirror elements comprising one or more micromirror elements, the one or more micromirror elements further comprising a plurality of rows, each row comprising a plurality of micromirror elements, each micromirror element associated with an optical channel, each micromirror element comprising:
a mirror having a substantially triangular shape and operable to:
reflect light at a first interaction area of the mirror to direct an associated optical channel, the first interaction area having a first width operable to yield a first passband for the optical channel; and
reflect light at a second interaction area of the mirror to direct the optical channel, the second interaction area having a second width operable to yield a second passband for the optical channel, the second passband different from the first passband; and
a mirror controller operable to:
position the mirror at a first position at which light interacts with the first interaction area of the mirror;
position the mirror at a second position at which light interacts with the second interaction area of the mirror;
position the mirror at a first port selection angle to direct the optical channel to a first port;
rotate the mirror about a port selection axis to a second port selection angle to direct the optical channel to a second port distinct from the first port;
position the mirror at a first attenuation angle to yield reflected light having a first power;
rotate the mirror about an attenuation axis to a second attenuation angle to yield reflected light having a second power different from the first power; and
a second layer comprising a plurality of second layer micromirror elements, a second layer micromirror element comprising a mirror having a substantially rectangular shape and having a third interaction area and a fourth interaction area, light interacting with the first layer prior to interacting with the second layer, wherein:
a mirror controller of a first layer micromirror element is further operable to translate the first layer micromirror element from the first position to the second position, the translation directing the light from the third interaction area to the fourth interaction area;
the one or more micromirror elements of the first layer further comprise a first micromirror element and a second micromirror element, the first micromirror element comprising a first mirror and a first mirror controller, the second micromirror element comprising a second mirror and a second mirror controller;
the first mirror controller is operable to translate the first mirror along a first direction from the first position to the second position; and
the second mirror controller is operable to translate the second mirror along a second direction from the first position to the second position, the second direction substantially parallel to the first direction.

* * * * *